United States Patent
Kenney et al.

(10) Patent No.: US 6,771,705 B2
(45) Date of Patent: Aug. 3, 2004

(54) TURBO ENCODER WITH TRANSMITTER DIVERSITY

(75) Inventors: Thomas J. Kenney, San Diego, CA (US); John Anderson Fergus Ross, Del Mar, CA (US)

(73) Assignee: Nokia Corporation, Espoo (FI)

( * ) Notice: Subject to any disclaimer, the term of this patent is extended or adjusted under 35 U.S.C. 154(b) by 339 days.

(21) Appl. No.: 09/775,095

(22) Filed: Feb. 1, 2001

(65) Prior Publication Data

US 2002/0101934 A1 Aug. 1, 2002

(51) Int. Cl.$^7$ .............................. H04B 7/02; H03M 13/00
(52) U.S. Cl. ........................ 375/267; 375/299; 714/755
(58) Field of Search ................................ 375/130–143, 375/260, 267, 285, 296, 299; 714/755, 786, 790; 370/209, 334, 335, 337, 441, 442

(56) References Cited

U.S. PATENT DOCUMENTS

| | | | | |
|---|---|---|---|---|
| 5,191,598 A | * | 3/1993 | Backstrom et al. | 375/347 |
| 5,907,582 A | | 5/1999 | Yi | 375/259 |
| 5,970,085 A | * | 10/1999 | Yi | 370/342 |
| 5,978,365 A | * | 11/1999 | Yi | 370/331 |
| 5,983,384 A | | 11/1999 | Ross | 714/755 |
| 6,061,387 A | * | 5/2000 | Yi | 375/142 |
| 6,128,330 A | * | 10/2000 | Schilling | 375/141 |
| 6,356,528 B1 | | 3/2002 | Lundby et al. | 370/209 |
| 6,480,503 B1 | * | 11/2002 | Yamaguchi et al. | 370/441 |

OTHER PUBLICATIONS

Jung et al., "Application of Turbo–Codes to a CDMA Mobile Radio System Using Joint Detection and Antenna Diversity", Proceedings of Vehicular Technology Conference, IEEE, Jun., 1994, pp. 770–774.

Sklar, B., "A Primer on Turbo Code Concepts", IEEE Communications Magazine, Dec., 1997, pp. 94–102.

* cited by examiner

Primary Examiner—Chieh M. Fan

(57) ABSTRACT

Turbo coding is employed with space-time spreading (STS) transmission to improve transmission error performance and efficiency in addressing multipath fading. Different subsets of parity data are transmitted via each antenna/channel, with either subset alone sufficient for error recovery. In general, however, both channels will be received with some fidelity, and the parity data from the two channels is combined and decoded as a lower code rate transmission. Systematic data may be transmitted on both channels, with or without interleaving on an alternate channel. Time diversity may also be introduced by transmitting only part of the parity data within the two parity data subsets, then transmitting the remainder if the receiver could not produce the correct decoding from the original transmission.

17 Claims, 5 Drawing Sheets

TURBO ENCODER WITH TRANSMITTER DIVERSITY

TECHNICAL FIELD OF THE INVENTION

The present invention is directed, in general, to wireless communications and, more specifically, to addressing multipath fading in wireless communications through transmitter diversity with efficient encoding.

BACKGROUND OF THE INVENTION

In wireless channels, where signals can arrive at different times following different paths, the received signals can experience large amplitude and phase variations due to the interference of the different paths. This phenomena is referred to as multipath fading, and the effect is a critical design parameter for consideration in receiver design. For terrestrial mobile telephony, multipath fading may dictate the entire system capacity and throughput rate.

Wireless signals transmitted from or to a mobile station may be reflected from the terrain, fixed or mobile objects in the propagation path such as buildings or vehicles, or from a discontinuity in the atmosphere. The energy of the reflected wireless signal is not significantly absorbed and/or attenuated, creating a plurality of different propagation paths for the wireless signals between the transmitter and receiver, referred to as multipath propagation, which allows the wireless signals to "bend" around corners and propagate beyond terrain features and objects obstructing the line-of-sight between the base and mobile stations.

Three problems associated with multipath propagation for mobile stations include (1) the delay spread of the received signal, (2) the Rayleigh fading in received signal strength caused by varying phase shifts between different paths, and (3) the varying frequency modulation due to the Doppler shift between various propagation paths. The fact that propagation paths for reflected signals are longer than the direct propagation path from the transmitter to the receiver (e.g., from the base station to the mobile station) gives rise to signal delays and, because various paths lead to slightly different arrival times, the received signal "spreads." Rayleigh fading results from differences between the phase and amplitude of the reflected wireless signals relative to the phase of a directly propagating signal, attenuating the signal strength at the receiving end (e.g., reception of two signals propagated along two different paths and arriving with a phase difference of 180 degrees results in cancellation in the receiver). Doppler shift is caused by the movement of the mobile station—or a vehicle or other reflecting object—in relation to the base station, such that the mean frequencies of both the received reflected signal and of the directly propagated signal deviate from the mean frequency of the transmitted signal by a different amount and in a different direction.

In general, multipath fading causes wide variations in received signal amplitudes, and much effort has been expended in attempting to mitigate the impact of multipath fading. One suggestion for minimizing the effects of multipath fading, set forth in the Electronics Industry Association Telecommunications Industry Association (EIA/TIA) proposed standard IS-2000, employs space-time spreading (STS), in which identically coded data frames are transmitted on each of two (preferably orthogonal) channels utilizing physically displaced antennas. In orthogonal transmit diversity (OTD), the identically coded data streams are demultiplexed onto the two antennas.

The underlying rationale for space-time spreading is that the two channels are unlikely to fade at the same time. However, the transmission of identical data on both channels is unnecessarily wasteful, and demultiplexing data from a single code rate onto two different antennas provides less than optimal performance. There is therefore a need in the art for improving the efficiency of space-time spreading transmit diversity in overcoming multipath fading.

SUMMARY OF THE INVENTION

To address the above-discussed deficiencies of the prior art, it is a primary object of the present invention to provide, for use in a wireless communications system, a mechanism for employing turbo coding together with space-time spreading (STS) transmission to improve transmission error performance and efficiency in addressing multipath fading. Different subsets of parity data are transmitted via each antenna/channel, with either subset alone sufficient for error recovery. In general, however, both channels will be received with some fidelity, and the parity data from the two channels is combined and decoded as a lower code rate transmission. Systematic data may be transmitted on both channels, with or without interleaving on an alternate channel. Time diversity may also be introduced by transmitting only part of the parity data within the two parity data subsets, then transmitting the remainder if the receiver could not produce the correct decoding from the original transmission.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 5, discussed below, and the various embodiments used below to describe the principles of the present invention are by way of illustration only and should not be construed in any way to limit the scope of the invention. Those skilled in the art will understand that the principles of the present invention may be implemented in any suitably arranged wireless communications system. Wireless communications system may conform with any of various known communications standards. For brevity, a complete description of the structure and operation of the wireless communications system will not be included herein, and only so much of the conventional wireless communications practices known in the art as are necessary for an understanding of the present invention are described.

Figure 1:
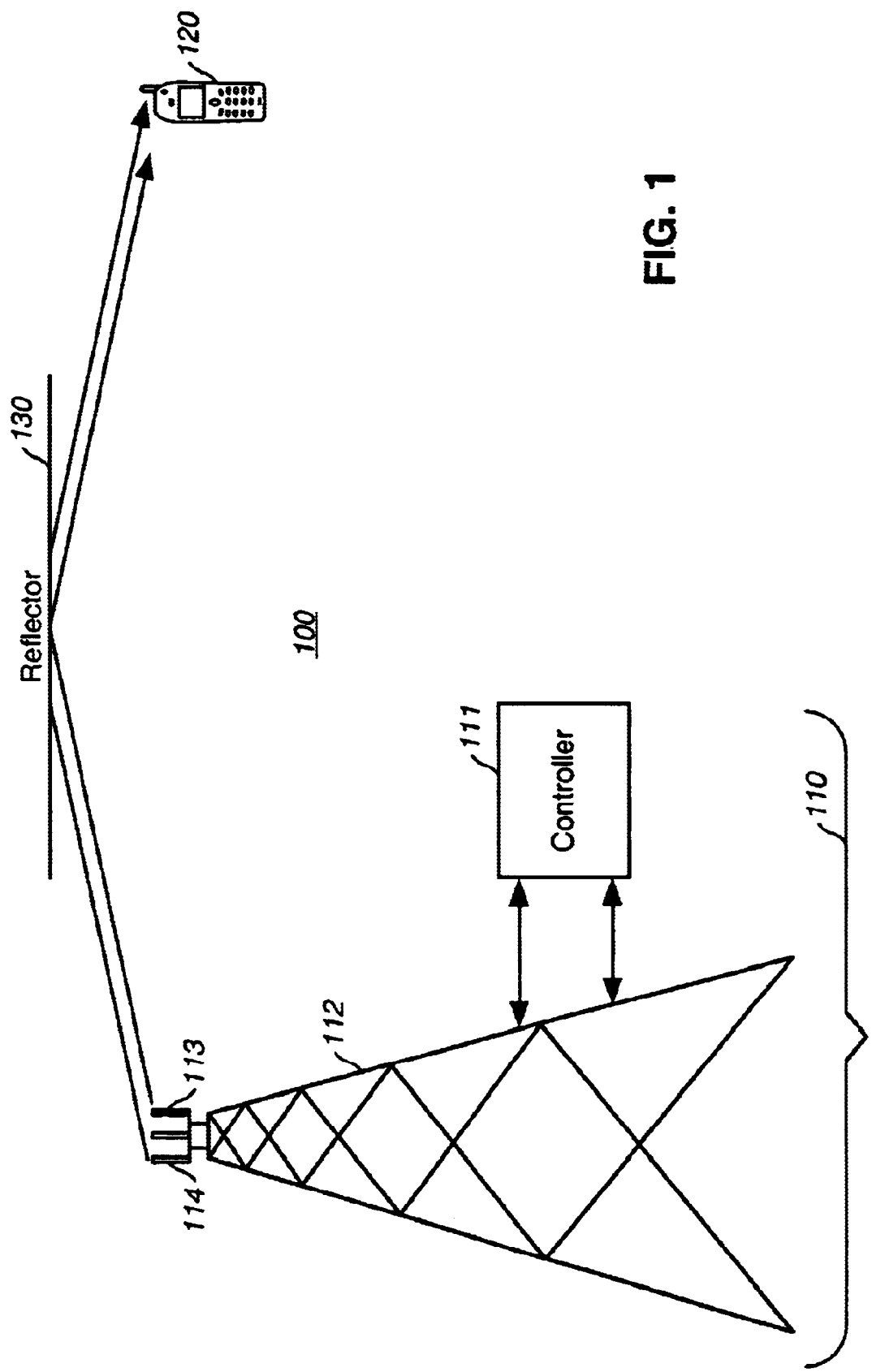
FIG. 1 illustrates a wireless communications system employing turbo-encoding with transmitter diversity according to one embodiment of the present invention.

FIG. 1 illustrates a wireless communications system employing "turbo-encoding" with transmitter diversity according to one embodiment of the present invention. Wireless communications system 100 includes a base transmitter station (BTS) 110 and a mobile station 120 which communication via wireless signals, preferably employing code division multiple access (CDMA) such as, for example, IS-95, CDMA 2000, HDR, 1Xtreme or WCDMA. Although depicted in the exemplary embodiment as a telephone, mobile station 120 may be any wireless communication device.

Base transmitter station 110 includes a controller 111 and a transmission facility 112 having transmitter diversity: two physically displaced antennas 113 and 114 in the exemplary embodiment. Rather than being spaced closely (e.g., on the order of half a wavelength) for array gain, antennas 113 and 114 are spaced far enough apart so that the received signals from the two antennas 113 and 114 fade almost independently, creating two channels. Additional antennas within the transmission facility may be spaced for array gain with antennas 113 and 114, or for other purposes.

A direct propagation path (not shown) between base transmitter station 110 and mobile station 120 may or may not be available, but at least one reflector object 130 creates indirect propagation paths between base transmitter station 110 and mobile station 120. As a result of the physical spacing, transmitted wireless signals from antennas 113 and 114 exhibit different received signal amplitude fading profiles after propagating along those indirect propagation paths. The fading profiles should be substantially independent—that is, the fading profiles may share some common fading regions in both channels but should differ between the two channels in some discernable and meaningful manner in at least one region.

Antennas 113 and 114 transmit in orthogonal or nearly orthogonal channels (e.g., utilizing orthogonal CDMA codes) and, unlike current proposals for space-time spreading, transmit different code sequences (content transmit diversity) rather than identical code sequences. To improve transmission error performance and transmission efficiency, the present invention employs turbo-coding of data packets generating independent parity information in conjunction with transmitter diversity through antennas 113 and 114 as described in further detail below. The result is a combination of transmitter diversity (preferably through both antenna spacing and orthogonal CDMA signal coding) and content transmit diversity which improves transmission performance, both in error rate and efficiency.

Figure 2:
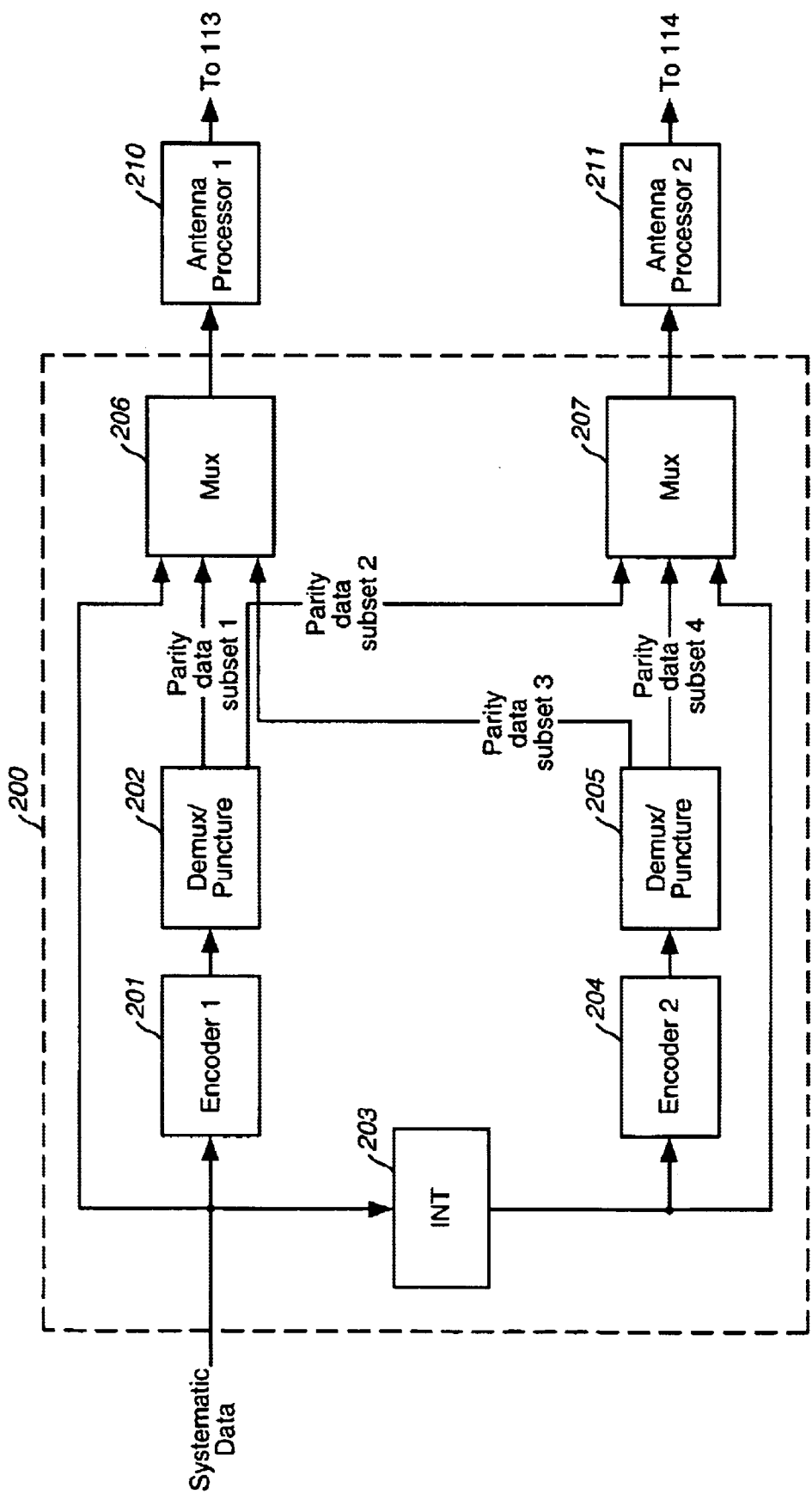
FIG. 2 illustrates in greater detail a block diagram for turbo-coding with content transmit diversity in an exemplary wireless communications system according to one embodiment of the present invention.

FIG. 2 illustrates in greater detail a block diagram for turbo-encoding with content transmit diversity in an exemplary wireless communications system according to one embodiment of the present invention. Turbo-encoding with content transmit diversity for transmission over a space-time spreading system is performed within base station transmitter controller 111, and includes a turbo-encoder 200 and antenna processors 210 and 211.

Turbo-encoding (also called "turbo-coding") refers to parallel concatenated (recursive systematic) convolutional coding, forward error correction (FEC) coding in which an information sequence is encoded twice, with the second encoding being performed after random interleaving of the information sequence. Each recursive systematic convolutional (RSC) encoder within a turbo-encoding mechanism produces parity data from systematic or information data, where normally only the systematic data for one encoder and punctured (selected bits deleted) parity data from each encoder is all that is transmitted in order to improve code rate. Decoding is iterative, with a resulting improvement in communications reliability.

In the present invention, turbo-encoder 200 receives systematic data and passes the systematic data to a first encoder 201, which generates parity data from the systematic data utilizing systematic recursive convolutional coding in accordance with the known art. The generated parity information for the systematic data is then passed to demultiplexer and puncture unit 202 to be duplicated and (optionally) punctured. The duplicate copies of the generated parity information for the systematic data are preferably punctured differently (e.g., the second copy is punctured in a manner complementary to the manner in which the first copy is punctured) to create distinct and differing parity data subsets 27.

The received systematic data is also interleaved (e.g., block interleaving, random interleaving, etc.) within interleaver 203, with the interleaved systematic data passed to a second encoder 204 which generates parity information for the interleaved systematic data, also utilizing systematic recursive convolutional coding in accordance with the known art. The generated parity information for the interleaved systematic data is then passed to a demultiplexer and puncture unit 205 to be duplicated and (optionally) punctured. Again, the two copies of the parity data generated for the interleaved systematic data are preferably punctured differently to create distinct and differing parity data subsets (parity data subset 3 and parity data subset 4).

The puncturing employed in creating the parity data subsets is selectively performed in accordance with known turbo-coding techniques to create different parity data subsets which may be utilized in independent combinations for successful reception of the systematic data despite fading. Thus, for example, parity data subset 1, taken in combination with the systematic data and either of parity data subsets 3 or 4, may be employed to reliably transmit the systematic data and correct any transmission errors. Similarly, parity data subset 2, taken with the systematic data and either of parity data subsets 3 or 4, may also be employed to reliably transmit the systematic data and correct any transmission errors.

Conventionally in turbo-encoding, only a single copy of the systematic data (e.g., the non-interleaved systematic data utilized by encoder 202) would be transmitted, together with the (punctured) parity data generated from both the non-interleaved systematic data by encoder 201 and the interleaved systematic data by encoder 204. The present invention combines, with the systematic data, only a selected subset of parity data generated from the non-interleaved systematic data by encoder 201 and a selected subset of parity data generated from the interleaved systematic data by encoder 204 for transmission on a given channel within the transmitter diversity wireless communications system. In the embodiment shown in FIG. 2, parity data subset 1 (generated from the non-interleaved systematic data) and parity data subset 3 (generated from the interleaved systematic data) are concatenated, together with the non-interleaved systematic data, by multiplexer 206 for transmission over one channel (i.e., via antenna 113).

Since a second, nominally independent channel is also available, a second subset of parity data generated from the non-interleaved systematic data by encoder 201, which differs from the non-interleaved systematic parity data subset transmitted over the first channel, and a second subset of parity data generated from the interleaved systematic data by encoder 204, which also differs from the interleaved systematic parity data subset transmitted over the first channel, are combined by a version of the systematic data for transmission over the second channel. In the embodiment shown in FIG. 2, parity data subset 2 (generated from the non-interleaved systematic data but different from parity data subset 1) and parity data subset 4 (generated from the interleaved systematic data but different from parity data subset 3) are concatenated with the interleaved systematic data by multiplexer 207 for transmission over the second channel (i.e., via antenna 114).

The concatenated codes from multiplexer 206 are passed to antenna processor 210, while the concatenated codes from multiplexer 207 are passed to antenna processor 211. The antenna processors 210 and 211 provide orthogonal (or near orthogonal) signal spreading for (signal) transmit diversity in wireless transmission. In the exemplary embodiment, antenna processor 210 combines the concatenated codes received from multiplexer 206 with a first CDMA code and passes the result for transmission on antenna 113, while antenna processor 211 combines the concatenated codes received from multiplexer 207 with a second CDMA code—preferably orthogonal to the first CDMA code—and passes the result for transmission on antenna 114. The concatenated codes are thus separated in transmission by transmitter diversity through both physical spacing of the antennas and orthogonal coding.

In the present invention, each antenna processor 210 and 211 is provided with a complete set of systematic data (either non-interleaved or interleaved) and with different subsets of parity information such that successful reception of complete data packets with only one channel is possible. If either channel should completely fade, correct decoding of the block is still possible with the signals received on the other channel. In general, however, both channels will most likely be received with some degree of fidelity and/or fading, in which case the two received channels may be combined (since the parity symbols are generated from the same turbo-encoder) and decoded as a lower code-rate code to increase error correction capability beyond that which is available by simply combining repeated identical transmitted bit sequences.

For example, because parity data subset 1 (received on one channel via antenna 113) and parity data subset 2 (received on the other channel via antenna 114) are differently-punctured versions of the same parity information generated by encoder 201, the two subsets may be combined to recreate the complete (unpunctured) parity information. Similarly, parity data subset 3 and parity data subset 4, received on different channels via different antennas, are also differently-punctured versions of the same parity information generated by encoder 204. Puncturing allows a higher code-rate to be employed in actual wireless transmission, but transmitter diversity (distinct channels) and content transmit diversity (different parity data subsets on different channels) enables error correction performance requiring a lower code-rate for transmission on a single channel.

Figure 3:
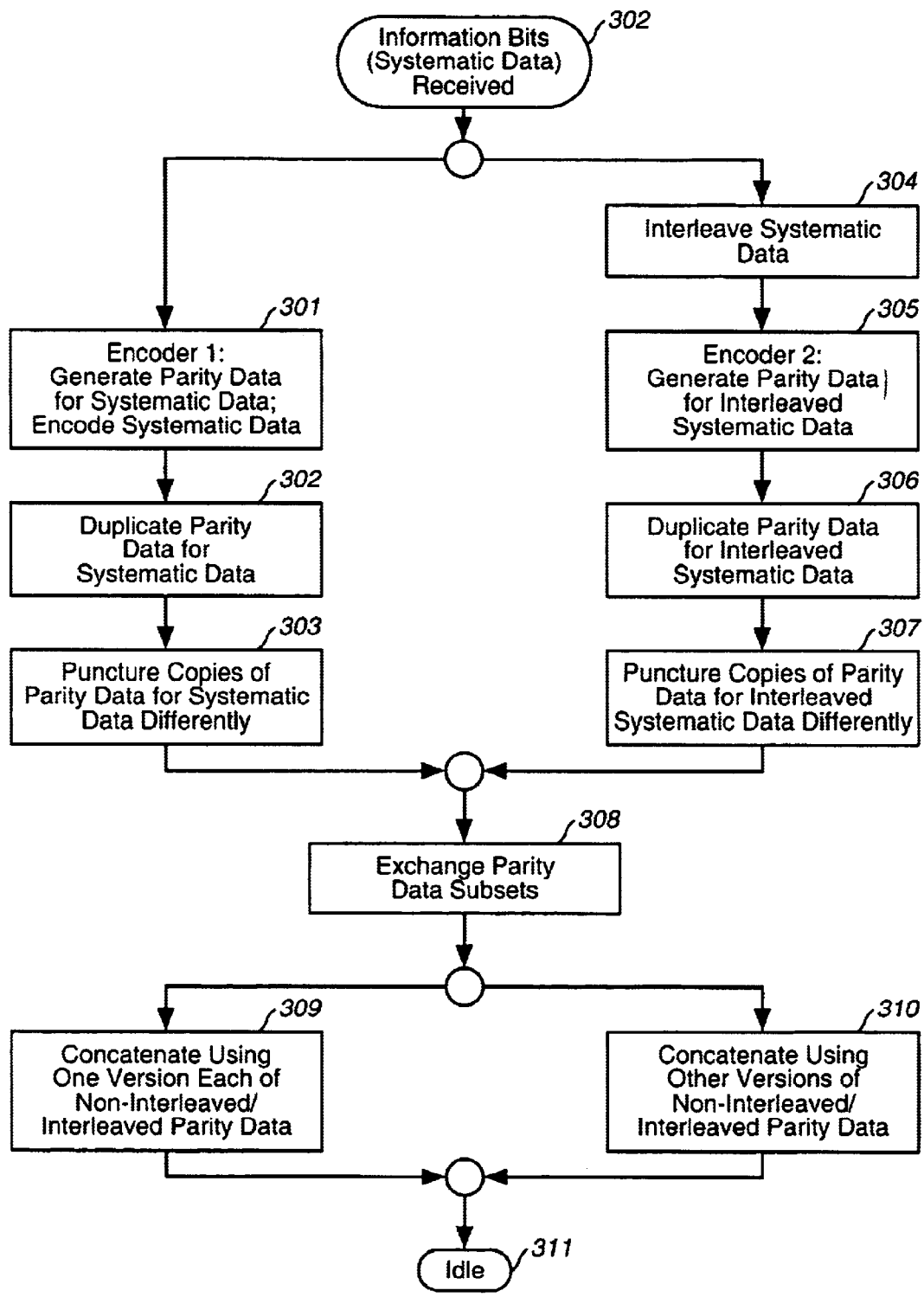
FIG. 3 is a flow diagram illustrating the operation of the exemplary turbo-coding with transmit diversity according to one embodiment of the present invention.

FIG. 3 is a flow diagram illustrating the operation of the exemplary turbo-coding with transmit diversity according to one embodiment of the present invention. The process begins with receipt of a packet of systematic data (step 300), and initially proceeds along concurrent parallel paths (steps 301–303 and steps 304–307). One path proceeds first to generating parity data for the received systematic data (step 301), then duplicates the generated parity data (step 302) and punctures the duplicate copies of the parity data differently (e.g., in a complementary manner) to create different subsets of parity data for the systematic data (step 303).

The alternate path first interleaves the received systematic data (step 304), either through block interleaving, random interleaving, or the like. Parity data for the interleaved systematic data is then generated (step 305), the generated parity data for the interleaved systematic data is duplicated (step 306), and the duplicate copies of the parity data for the interleaved systematic data are punctured differently (step 307) to create different subsets of parity data for the interleaved systematic data.

Once distinct subsets of parity data for both the systematic data and the interleaved systematic data have been created, the two alternate paths then merge to exchange parity data subsets (step 308). The process then diverges again along concurrent parallel paths in concatenating the parity data with the systematic data for transmission, with one of the different (puncture version) subsets of parity data for the systematic data being combined with one of the different subsets of parity data for the interleaved systematic data (step 309), and the remaining subset of parity data for the systematic data being combined with the other remaining subset of parity data for the interleaved systematic data (step 310). The concatenated parity data subsets, which are both independent and may be used without the other concatenated parity data for error recovery, are then combined with the systematic data for transmission. Either the systematic data may be transmitted on one channel and the interleaved systematic data transmitted on the alternate channel, or the systematic data may be transmitted on both channels as described below. The process then becomes idle (step 311) until the next packet of systematic data is received.

Figure 4:
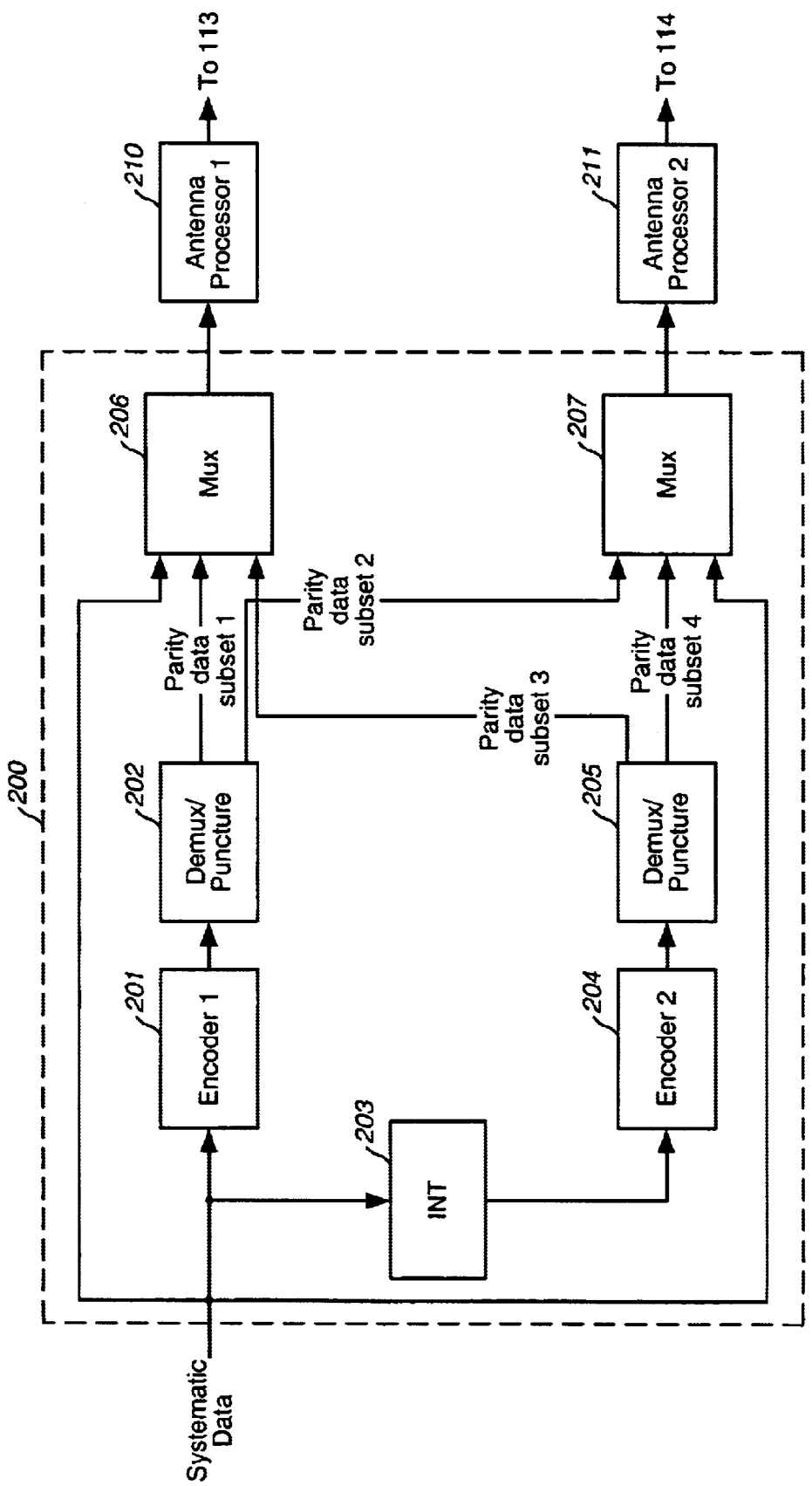
FIG. 4 illustrates a block diagram for turbo-coding with transmit diversity in an exemplary wireless communications system according to another embodiment of the present invention.

FIG. 4 illustrates a block diagram for turbo-coding with transmit diversity in an exemplary wireless communications system according to another embodiment of the present invention. In this embodiment, the systematic data is transmitted on both channels rather than transmitting the systematic data on one channel and the interleaved systematic data on the alternate channel. Accordingly, multiplexer 207 receives a non-interleaved copy of the systematic data in this embodiment. Interleaving of the systematic data is still performed, and independent parity data subsets for both the non-interleaved and interleaved systematic data are generated for mixed concatenation and transmission with the systematic data over the two antenna. In this embodiment, use of two different channel interleavers (not shown), one each for both channels, interleaving the received systematic data in two different manners prior to generating the parity data within encoder 201 and encoder 204 would be beneficial. The embodiment of FIG. 2 is less complex than this embodiment.

Figure 5:
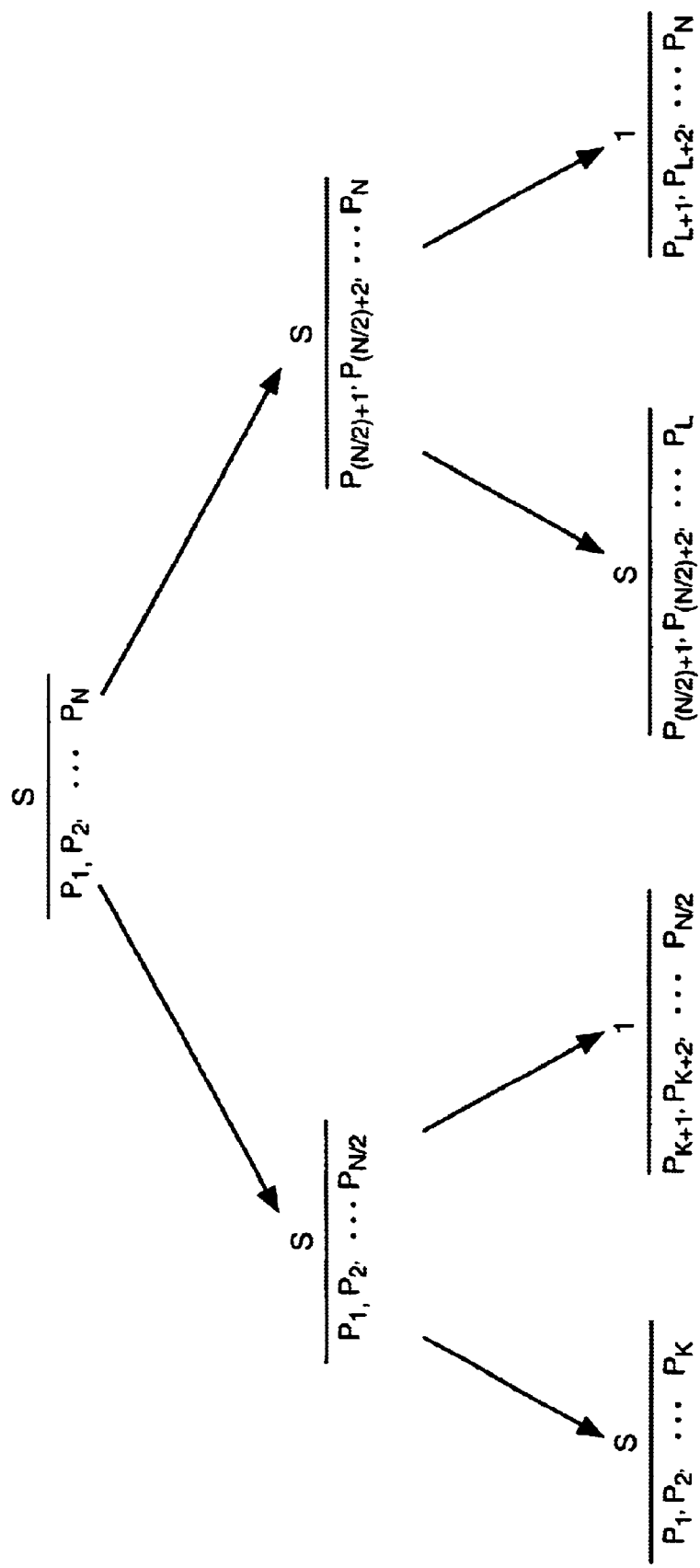
FIG. 5 depicts a logical division of systematic and parity data for transmit diversity according to one embodiment of the present invention.

FIG. 5 depicts a logical division of systematic and parity data for transmit diversity according to one embodiment of the present invention. In addition to the other forms of diversity employed (transmitter diversity, transmit coding diversity, and content diversity), time diversity may be employed with turbo coding in the present invention, attaining additional diversity by separating signals in time. In this embodiment, the parity data in logically divided into four different subsets. As shown in FIG. 5, the parity codes $P_1$ through $P_N$ generated for the systematic data S (either non-interleaved or interleaved) may be logically divided into two subsets of codes $P_1$ through $P_{N/2}$ and $P_{(N/2)+1}$ through $P_N$ for transmission with the systematic data S. Different puncturing of the parity data as described above achieves essentially the same result, except that the two subsets of codes may not contain sequentially consecutive code.

The two subsets of parity codes $P_1$ through $P_{N/2}$ and $P_{(N/2)+1}$ through $P_N$ may then be further subdivided into two subsets of codes each, for a total of four subsets of parity codes: $P_1$ through $P_K$; $P_{K+1}$ through $P_{N/2}$; $P_{(N/2)+1}$ through $P_L$; and $P_{L+1}$ through $P_N$. Two of the four subsets—$P_1$ through $P_K$ and $P_{(N/2)+1}$ through $P_L$ in the exemplary embodiment—are transmitted with the systematic data on the antenna pairs. The remaining two subsets—$P_{K+1}$ through $P_{N/2}$ and $P_{L+1}$ through $P_N$ for the example shown—are then subsequently transmitted (without the systematic data S) during a later transmission period. Subsequent transmission of the second sets of parity codes may optionally be conditioned on whether the first transmission produced the correct decoding within the receiver. For example, the transmitter may subsequently transmit the second sets of parity codes only if the transmitter receives a negative acknowledgement (NAK) response for the first transmission. The transmit station may either store the systematic and parity data during the interim, or may regenerate the second set of parity codes "on-the-fly" if required in order to save memory.

The present invention mitigates the impact of multipath fading while improving transmission error performance and efficiency over existing proposed solutions, and is well-suited for implementation within any CDMA system. By combining turbo coding with space-time spreading and providing independent parity information on each channel, the parity information received on both channels may be combined for decoding as a lower code rate code, effectively improving spectral efficiency. The present invention intelligently combines orthogonal transmit diversity and turbo encoding to increase mobile handset performance and system capacity.

It is important to note that while the present invention has been described in the context of a fully functional wireless communications system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

Although the present invention has been described in detail, those skilled in the art should understand that they can make various changes, substitutions and alterations herein without departing from the spirit and scope of the invention in its broadest form.

What is claimed is:

1. For use in a wireless communications system, a system for turbo encoding with transmit diversity, said system comprising:

first and second physically displaced antennas sufficiently spaced to produce substantially independent fading of signals received at a receiving station;

a first encoding unit coupled to said first antenna, said first encoding unit receiving systematic data and generating first and second subsets of parity data for said systematic data;

a second encoding unit coupled to said second antenna, said second encoding unit receiving interleaved systematic data and generating first and second subsets of parity data for said interleaved systematic data, said first subset of parity data for said systematic data and said first subset of parity data for said interleaved systematic data forming first parity data for transmission via said first antenna, a first antenna processor coupled between said first encoding unit and said first antenna and receiving said systematic data and said first parity data, said first antenna processor coding said systematic data and said first parity data in a first manner for transmission via said first antenna, said first antenna processor logically dividing said first parity data into first and second portions, transmitting said first portion of said first parity data together with said systematic data during a first transmission period, and transmitting said second portion of said first parity data during a second transmission period subsequent to said first transmission period, said second subset of parity data for said systematic data and said second subset of parity data for said interleaved systematic data forming second parity data for transmission via said second antenna, a second antenna processor coupled between said second encoding unit and said second antenna and receiving one of said systematic data and said interleaved systematic data, and said second parity data, said second antenna processor coding one of said systematic data and said interleaved systematic data, and second parity data in a second manner substantially orthogonal to said first manner for transmission via said second antenna, said second antenna processor logically dividing said second parity data into first and second portions, transmitting said first portion of said second parity data together with one of said systematic data and said interleaved systematic data during said first transmission period, and transmitting said second portion of said second parity data during said second transmission period, wherein either one of said first parity data or said second parity data may be employed without an other of said first parity data or said second parity data for error correction in decoding said systematic data.

2. The system for turbo encoding with transmit diversity as set forth in claim 1 further comprising:

a first multiplexer concatenating said systematic data and said first parity data for transmission via said first antenna; and a second multiplexer concatenating said interleaved systematic data and said second parity data for transmission via said second antenna.

3. The system for turbo encoding with transmit diversity as set forth in claim 1 further comprising:

a first multiplexer concatenating said systematic data and said first parity data for transmission via said first antenna; and a second multiplexer concatenating said systematic data and said second parity data for transmission via said second antenna.

4. The system for turbo encoding with transmit diversity as set forth in claim 1, further comprising:
a first encoder within said first encoding unit, said first encoder receiving and turbo coding said systematic data to generate parity information for said systematic data; and
a second encoder within said second encoding unit, said second encoder receiving and turbo coding said interleaved systematic data to generate parity information for said interleaved systematic data.

5. The system for turbo encoding with transmit diversity as set forth in claim 4 further comprising:
a first duplicating circuit within said first encoding unit coupled to an output of said first encoder and receiving said parity information generated by said first encoder, said first duplicating circuit creating first and second copies of said parity information generated by said first encoder; and
a second duplicating circuit within said second encoding unit coupled to an output of said second encoder and receiving said parity information generated by said second encoder, said second duplicating circuit creating first and second copies of said parity information generated by said second encoder.

6. The system for turbo encoding with transmit diversity as set forth in claim 5 further comprising:
a first puncture unit within said first encoding unit coupled to an output of said first duplicating circuit and receiving said first and second copies of said parity information generated by said first encoder, said first puncture unit puncturing said first copy of said parity information generated by said first encoder in a first manner to create said first subset of parity data for said systematic data and puncturing said second copy of said parity information generated by said first encoder in a second manner different than said first manner to create said second subset of parity data for said systematic data; and
a second puncture unit within said second encoding unit coupled to an output of said second duplicating circuit and receiving said first and second copies of said parity information generated by said second encoder, said second puncture unit puncturing said first copy of said parity information generated by said second encoder in said first manner to create said first subset of parity data for said interleaved systematic data and puncturing said second copy of said parity information generated by said second encoder in said second manner to create said second subset of parity data for said interleaved systematic data.

7. The system for turbo encoding with transmit diversity as set forth in claim 6 further comprising:
an interleaver coupled to an input of said second encoding unit, said interleaver receiving and interleaving said systematic data to generate said interleaved systematic data.

8. The system for turbo encoding with transmit diversity as set forth in claim 1, wherein said first parity data and said second parity data may be combined for decoding at a lower code rate than decoding with either said first parity data or said second parity data alone.

9. For use in a wireless communications system, a method of turbo encoding with transmit diversity comprising the steps of:
sufficiently spacing first and second physically displaced antennas to produce substantially independent fading of signals received at a receiving station;
generating first and second subsets of parity data for systematic data utilizing a first encoding unit coupled to said first antenna; and
generating first and second subsets of parity data for interleaved systematic data utilizing a second encoding unit coupled to said second antenna;
wherein said first subset of parity data for said systematic data and said first subset of parity data for said interleaved systematic data form first parity data for transmission via said first antenna and said second subset of parity data for said systematic data and said second subset of parity data for said interleaved systematic data form second parity data for transmission via said second antenna,
wherein either one of said first parity data or said second parity data may be employed without an other of said first parity data or said second parity data for error correction in decoding said systematic data,
logically dividing said first parity data into first and second portions;
transmitting said first portion of said first parity data together with said systematic data during a first transmission period;
transmitting said second portion of said first parity data during a second transmission period subsequent to said first transmission period;
logically dividing said second parity data into first and second portions;
transmitting said first portion of said second parity data together with one of said systematic data and said interleaved systematic data during said first transmission period; and
transmitting said second portion of said second parity data during said second transmission period.

10. The method of turbo encoding with transmit diversity as set forth in claim 9 further comprising:
concatenating said systematic data and said first parity data for transmission via said first antenna; and
concatenating said interleaved systematic data and said second parity data for transmission via said second antenna.

11. The method of turbo encoding with transmit diversity as set forth in claim 9 further comprising:
concatenating said systematic data and said first parity data for transmission via said first antenna; and
concatenating said systematic data and said second parity data for transmission via said second antenna.

12. The method of turbo encoding with transmit diversity as set forth in claim 9, further comprising:
employing a first encoder within said first encoding unit to generate parity information for said systematic data; and
employing a second encoder within said second encoding unit to generate parity information for said interleaved systematic data.

13. The method of turbo encoding with transmit diversity as set forth in claim 12 further comprising:
duplicating said parity information generated by said first encoder to create first and second copies of said parity information generated by said first encoder; and
duplicating said parity information generated by said second encoder to create first and second copies of said parity information generated by said second encoder.

14. The method of turbo encoding with transmit diversity as set forth in claim 13 further comprising:

puncturing said first copy of said parity information generated by said first encoder in a first manner to create said first subset of parity data for said systematic data;

puncturing said second copy of said parity information generated by said first encoder in a second manner different than said first manner to create said second subset of parity data for said systematic data;

puncturing said first copy of said parity information generated by said second encoder in said first manner to create said first subset of parity data for said interleaved systematic data; and puncturing said second copy of said parity information generated by said second encoder in said second manner to create said second subset of parity data for said interleaved systematic data.

15. The method of turbo encoding with transmit diversity as set forth in claim 14 further comprising:

interleaving said systematic data to generate said interleaved systematic data.

16. The method of turbo encoding with transmit diversity as set forth in claim 9 further comprising:

coding said systematic data and said first parity data in a first manner for transmission via said first antenna; and coding one of said systematic data and said interleaved systematic data, and said second parity data in a second manner substantially orthogonal to said first manner for transmission via said second antenna.

17. The method of turbo encoding with transmit diversity as set forth in claim 9, wherein said steps of generating first and second subsets of parity data for systematic data utilizing a first encoding unit coupled to said first antenna and generating first and second subsets of parity data for interleaved systematic data utilizing a second encoding unit coupled to said second antenna further comprise:

generating first parity data and said second parity data which may be combined for decoding at a lower code rate than decoding with either said first parity data or said second parity data alone.

* * * * *